United States Patent [19]

Kono et al.

[11] Patent Number: 5,756,938
[45] Date of Patent: May 26, 1998

[54] WEIGHT MEASURING APPARATUS

[75] Inventors: Katsuaki Kono; Kazufumi Naito, both of Shiga, Japan

[73] Assignee: Ishida Scales Mfg. Co., Ltd., Kyoto, Japan

[21] Appl. No.: 421,276

[22] Filed: Apr. 13, 1995

Related U.S. Application Data

[63] Continuation of Ser. No. 288,780, Aug. 12, 1994, abandoned, and a continuation of Ser. No. 768,571, Sep. 20, 1991, abandoned.

[30] Foreign Application Priority Data

Jan. 25, 1990 [JP] Japan ................................. 2-016501

[51] Int. Cl.⁶ ............................................. G01G 19/22
[52] U.S. Cl. ........................ 177/25.13; 177/199; 364/567
[58] Field of Search ........................ 177/25.13, 25.18, 177/50, 199, 211; 364/567

[56] References Cited

U.S. PATENT DOCUMENTS

| | | | |
|---|---|---|---|
| 4,529,050 | 7/1985 | Mosher et al. | 177/25.18 X |
| 4,535,854 | 8/1985 | Gard et al. | 177/1 |
| 4,535,857 | 8/1985 | Haze | 177/50 |
| 4,691,290 | 9/1987 | Griffen | 364/567 |
| 4,705,126 | 11/1987 | Naito | 177/50 |
| 4,734,873 | 3/1988 | Malloy et al. | 364/571.03 |
| 4,771,836 | 9/1988 | Naito et al. | 177/25.18 |
| 4,790,398 | 12/1988 | Nobutsugu | 177/1 |
| 4,793,420 | 12/1988 | Hirano | 177/25.18 |
| 4,804,052 | 2/1989 | Griffen | 177/25.14 |
| 4,817,026 | 3/1989 | Inoue et al. | 364/724.01 |
| 4,836,310 | 6/1989 | Yamano | 177/25.18 |
| 4,850,442 | 7/1989 | Naito et al. | 177/164 |
| 4,909,338 | 3/1990 | Vitunic et al. | 177/25.14 X |
| 4,914,611 | 4/1990 | Yamanaka et al. | 364/567 |
| 4,951,763 | 8/1990 | Zimmerman et al. | 177/164 |
| 4,967,384 | 10/1990 | Molinar et al. | 364/567 |
| 4,979,580 | 12/1990 | Lockery | 177/211 |
| 5,117,929 | 6/1992 | Nakamura et al. | 177/185 |
| 5,130,938 | 7/1992 | Inoue | 364/567 |

FOREIGN PATENT DOCUMENTS

| | | |
|---|---|---|
| 58-90856 | 5/1983 | Japan . |
| 62-118219 | 5/1987 | Japan . |
| 62-201304 | 9/1987 | Japan . |
| 63-204103 | 8/1988 | Japan . |
| 2191001 | 12/1987 | United Kingdom . |

OTHER PUBLICATIONS

Oppenheim et al, *Signals and Systems* copyright 1983 pp. 527–537; 553.
Supplementary European Search Report, US-A-4 804 052 (Neil C. Griffen) and GB-A-21 191 001 (W & T Avery Limited).

*Primary Examiner*—Michael L. Gellner
*Assistant Examiner*—Randy W. Gibson
*Attorney, Agent, or Firm*—Sughrue, Mion, Zinn, Macpeak & Seas, PLLC

[57] ABSTRACT

A weight measuring apparatus which comprises an input signal switching circuit for selectively outputting analog signals input to a plurality of channels, analog-to-digital converter for converting an analog signal output from the input signal switching circuit into a digital signal, and a digital signal processing circuit for filtering a digital quantity output from the analog-to-digital converter for each channel, or filtering digital quantities from a plurality of channels after these digital quantities have been combined together.

38 Claims, 4 Drawing Sheets

WEIGHT MEASURING APPARATUS

This is a continuation of application Ser. No. 08/288,780 filed Aug.12, 1994, now abandoned and a Continuation of application Ser. No. 07/768,571 filed Sep. 20, 1991 (now abandoned).

TECHNICAL FIELD

The present invention relates to a weight measuring apparatus which is arranged such that analog signals from different lines are input thereto through a plurality of channels. More particularly, the present invention relates to a weight measuring apparatus which is designed so that various measuring error factors included in an analog signal from each line, e.g., a drift in an analog signal processing circuit, a zero point change of the load cell output, etc., are removed by a digital signal processing means that executes a real-time filtering process.

BACKGROUND ART

As is generally known, with the recent remarkable improvement in measuring accuracy, various error factors which cannot be removed by a filter have become problems. Examples of such error factors are a drift that occurs in an analog signal processing system, a zero point change of the load cell output due to temperature, and so forth. To solve these problems, the present applicant disclosed following inventions:

(1) Japanese Patent Unexamined Publication No. Sho. 62-118219 (U.S. Pat. No. 4,705,126; EP-B1-026638) in regard to the problem of the drift; and (2) Japanese Patent Unexamined Publication No. Sho. 63-204103 in regard to the problem of the zero point change of the load cell output.

However, in the above-mentioned invention (1), a post-stage digital signal processing system comprises a single line, whereas an analog signal processing system which is previous to it comprises a plurality of lines, and an analog filter is used in each line. In consequence, the circuit is complicated, the number of parts increases, and mounting of circuit elements becomes troublesome. In addition, since analog filters are used, each filter must be switched over to a buffer in the drift compensation mode, so that the circuit becomes complicated further correspondingly. In a case where the filter constant must be varied in accordance with the installation environment, replacement of a circuit element that determines the filter constant is also troublesome.

To avoid such problems, it may be an effective practice to insert an analog filter in between a multiplexer and an analog-to-digital converter means to thereby reduce the number of filter circuits. By so doing, however, a response lag occurs in the analog filter when an input signal is switched over to another, so that this technique cannot be applied to a weighing apparatus which needs to execute sequential processing of analog signals from a plurality of lines.

The above-mentioned invention (2) needs in the temperature detection mode to pass a signal from a temperature sensor through a filter for a weight signal which differs therefrom in frequency characteristics and hence it involves a slight lag in the signal processing. When the signal processing system comprises a single line, the signal processing lag can be ignored to a certain extent. However, when the signal processing system comprises a plurality of lines, the lag cannot be ignored. For this reason, the invention (2) cannot be applied to a weighing apparatus which needs to execute sequential processing of analog signals from a plurality of lines.

The present invention aims at solving the above-described problems, and it is an object of the present invention to provide a weight measuring apparatus which is designed so that, even if the analog signal processing system comprises a plurality of lines, signal processing can be effected at high speed as if the system were comprised of a single line and that it is also possible to compensate for a drift that occurs in each analog signal processing system, a zero point change of the load cell output due to temperature, and so forth.

DISCLOSURE OF THE INVENTION

The weight measuring apparatus of the present invention comprises input signal switching means for selectively outputting analog signals input to a plurality of channels, analog-to-digital converter means (hereinafter referred to as "A/D converter means") for converting an analog signal output from the input signal switching means into a digital signal, and digital signal processing means (hereinafter referred to as "DSP") for filtering a digital quantity output from the analog-to-digital converter means for each channel, or filtering digital quantities from a plurality of channels after these digital quantities have been combined together.

In a case where the weight measuring apparatus is a weight checker that comprises a weighting conveyor and a plurality of load cells that support it, analog signals from various channels that are input to the input signal switching means are defined as output signals from the corresponding load cells. Thus, the load cell outputs are sequentially input to the A/D converter means by a channel switching operation. The DSP filters a digital quantity in each channel that is output from the A/D converter means for each channel and outputs the filtered digital quantity to a microcomputer. The microcomputer adds together the digital quantities from the various channels to determine a weight value. Alternatively, the digital quantities are added together directly in the DSP to determine a weight value without supplying them to the microcomputer. It is also possible to add together digital quantities from the various channels in the DSP before filtering and then filter the resulting sum to obtain a weight value. Thus, the load cell outputs are sequentially input to the DSP at a sampling period that is determined by the A/D converter means. Moreover, filtering for each channel is sequentially executed with a time lag involved in the digital conversion. Accordingly, filtering for each channel can be regarded as progressing in parallel and substantially simultaneously considering the time cycle required for weighing. As a result, even in a weighing apparatus that needs to input sequentially analog signals from different lines through a plurality of channels, signal processing can be executed at high speed as if the apparatus were comprised of a single line.

In the case of compensating for a drift that occurs in an analog signal processing system, an analog signal that is input to one channel is defined as a reference voltage signal, and the DSP obtains a drift from a temporal change of the reference voltage signal. The DSP then subtracts the drift from the digital quantity of a weight signal input thereto from the same analog signal processing system. More specifically, if there are analog signal processing systems for a plurality of channels, a drift is obtained for each channel, and it is subtracted from the digital quantity in the corresponding channel. In this case, the digital quantity of the reference voltage signal is used as it is or after being filtered to obtain a drift, and the drift thus obtained is subtracted from the digital quantity of the filtered weight signal.

Alternatively, the drift is subtracted from the digital quantity of the weight signal before filtering, and the result of the subtraction is filtered to obtain a weight value. In a case where digital quantities from a plurality of channels are added together to determine a weight value, the drift in each channel is subtracted from the sum of the digital quantities before filtering and the result of the subtraction is then filtered. Alternatively, the drift in each channel is subtracted from the filtered sum. Thus, even when weight signals from a plurality of channels are added together to determine a weight value, it is possible to prevent enlargement of a weighing error due to cumulation of the drift in each channel.

In the case of compensating for a zero point change of the load cell output due to temperature, analog signals that are input to half the number of channels at the most are output signals each from a temperature sensor that detects the temperature of the corresponding load cell, and the DSP outputs the output signal from the temperature sensor to the microcomputer as it is or after it has been filtered. The microcomputer deduces a load cell temperature at that time from the output temperature characteristics of the temperature sensor already stored on the basis of the temperature detecting signal and calculates a zero point change of the load cell output at the temperature concerned from the deduced temperature and the output temperature characteristics of the load cell output. Then, the zero point change is transferred to and stored in the DSP. Such processing may also be executed in the DSP, as a matter of course. Thus, the microcomputer or the DSP subtracts the stored zero point change from the digital quantity corresponding to the output signal of the load cell. At this time, the zero point change may be subtracted from the filtered digital quantity, or filtering may be effected after the subtraction. Since such temperature compensation needs to be made for each load cell, each of the load cells is designated at a proper timing to obtain a zero point change in advance. In a case where digital quantities from a plurality of channels are added together to determine a weight value, the zero point change in each channel is subtracted from the sum of the digital quantities before filtering, and the result of the subtraction is then filtered. Alternatively, the sum of the digital quantities is first filtered and the zero point change in each channel is then subtracted from the filtered sum. Thus, even when there are a plurality of load cells, it is possible to effect accurate weighing independently of temperature.

In addition, it is possible to make the above-described temperature compensation and drift compensation together by a similar channel switching operation regardless of whether the system comprises a single load cell or a plurality of load cells. For example, in the case of a single load cell, a three-channel input signal switching means is used, and a weight signal from the load cell is input to one of the three channels, a reference voltage signal to another channel, and a detection signal from a temperature sensor to the other channel.

BEST MODE FOR CARRYING OUT THE INVENTION

The present invention will be described below in detail by way of one embodiment and with reference to the accompanying drawings.

Figure 1:
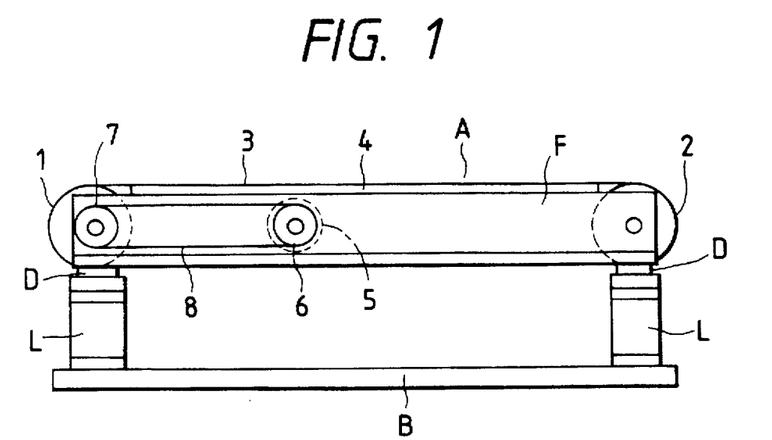
FIG. 1 is a side view of a weighing section of a weight checker which is formed using a plurality of load cells.
Figure 2:
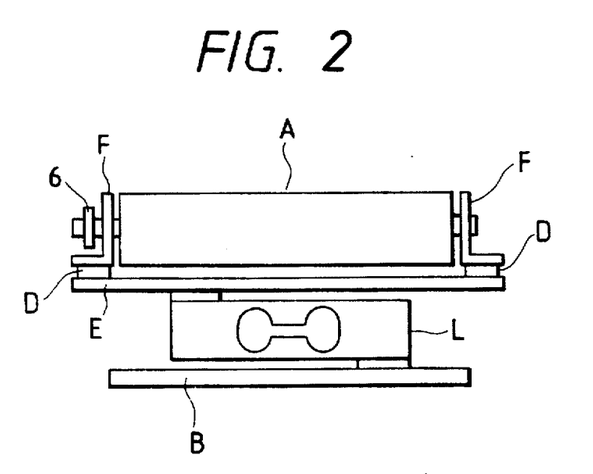
FIG. 2 is a front view of the weighing section.

FIG. 1 is a side view of a weighting section of a weight checker, and FIG. 2 is a front view of the weighing section.

In these figures, a weighing conveyor A is supported by a pair of front and rear load cells L each disposed in a direction perpendicular to the direction of movement of the conveyor A. Rubber vibration isolators D are interposed between the weighing conveyor A and the load cells L to absorb horizontal stress that is induced in the load cells L by the deflection of the weighing conveyor A.

The weighing conveyor A comprises a pair of front and rear rollers 1 and 2, which are attached to frames F, a flat belt 3 that is stretched between the rollers 1 and 2, a top plate 4 that is disposed underneath the upper running section of the flat belt 3, a motor 5 that is attached to the frames F under the top plate 4, a pulley 6 that is secured to a driving shaft of the motor 5, a pulley 7 that is secured to a rotating shaft of one roller 1, and a toothed belt 8 that is stretched between the two pulleys 6 and 7. Each load cell L, which is of the parallel beam type, is attached at one end (fixed end) thereof to a base B and has a bracket E attached to the other end (movable end) thereof, thereby supporting the weighing conveyor A. Although two load cells are used in this embodiment, the number of load cells may be varied according to need.

Figure 3:
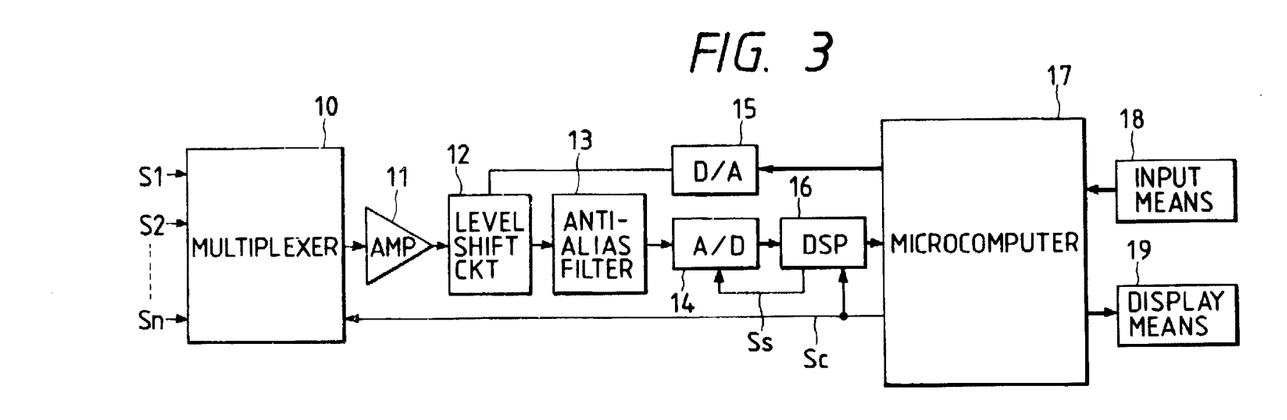
FIGS. 3 and 4 block diagrams each showing one example of a signal processing circuit of the weight checker.
Figure 4:
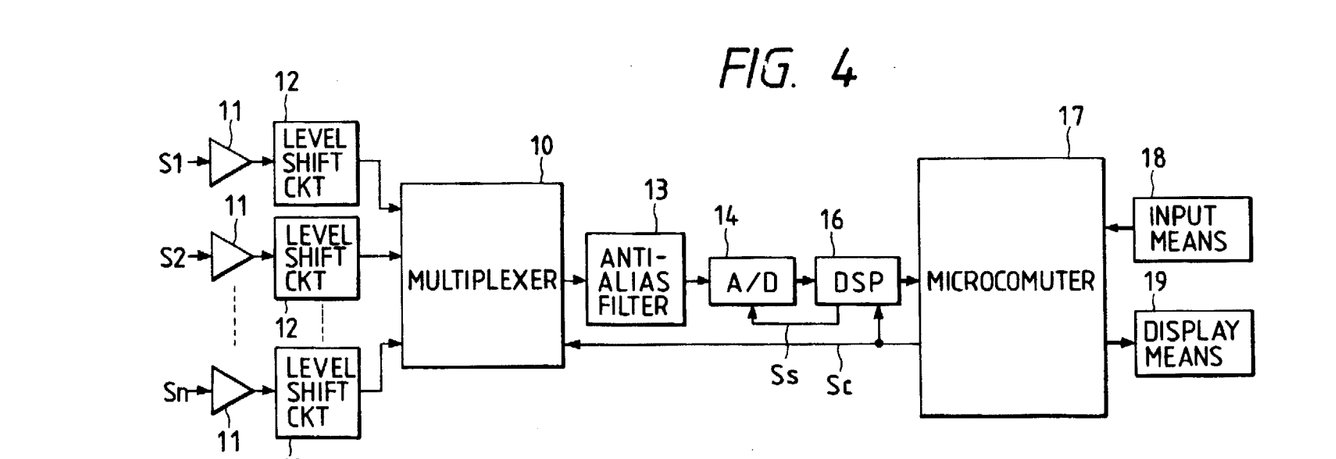

FIGS. 3 and 4 are block diagrams each showing a signal processing circuit of the weight checker in which the weighing conveyor A is supported by a plurality of load cells L. The signal processing circuit shown in FIG. 3 is arranged such that output signals S1 to Sn from the load cells L are input directly to a multiplexer 10 that functions as an input signal switching means. The signal processing circuit shown in FIG. 4 is arranged such that the output signals S1 to Sn from the load cells L are input to the multiplexer 10 through respective operational amplifiers 11.

Thus, in the signal processing circuit shown in FIG. 3, the analog signals S1 to Sn that are input to the multiplexer 10 are selected in response to a channel switching signal Sc from a microcomputer 17 and output to an operational amplifier 11. The operational amplifier 11 amplifies the input analog signal with a predetermined amplification factor and outputs the amplified analog signal to an anti-alias filter 13 through a level shift circuit 12.

In the signal processing circuit shown in FIG. 4, the output signals S1 to Sn from the load cells are amplified in the respective operational amplifiers 11 before being input to the multiplexer 10 through the respective level shift circuits 12. In the multiplexer 10, one of the signals S1 to Sn is selected and input to an anti-alias filter 13 in response to a channel switching signal Sc from a microcomputer 17.

The level shift circuits 12 are provided to match the dynamic range of the analog signals S1 to Sn with the input range of an A/D converter means 14. The level shift circuit 12 in FIG. 3 comprises an adder that adds together an output voltage from a digital-to-analog converter 15 and an output voltage from the operational amplifier 11, whereas each level shift circuit 12 in FIG. 4 comprises a bias circuit.

The anti-alias filter 13 comprises an analog filter that passes only a signal in a frequency band that satisfies a sampling theorem, thereby preventing a return phenomenon which would otherwise be caused by a signal in a frequency band above ½ of the sampling frequency that is determined by the A/D converter means 14.

The A/D converter means 14, which comprises a successive comparison type A/D converter, is arranged such that its A/D converting operation and a filtering operation by a DSP (Digital Signal Processor) 16 are synchronized with each other by a synchronizing signal Ss that is output from the DSP 16.

The digital-to-analog converter 15 operates such that analog signal levels whose initial values vary from each other are adjusted to substantially the same level. The digital-to-analog converter 15 is instructed by the microcomputer 12 to output a voltage for shifting a signal level in a designated channel to a predetermined level. Accordingly, in a case where the output levels of the analog signals S1 to Sn are substantially equal to each other, the digital-to-analog converter 15 may be omitted. In such a case, the level shift circuit comprises a mere bias circuit.

The DSP 16 effects filtering by a numerical calculation, as is generally known, and has an FIR (Finite Impulse Response) type low-pass filter which has been programmed therein. In response to a channel switching signal Sc from the microcomputer 12, the DSP 16 executes filtering regarding the channel concerned and also executes a predetermined processing programmed, thereby calculating a weight value. This processing will be described later.

It should be noted that reference numeral 18 denotes an input means for inputting various kinds of data, and 19 a display means.

Figure 5:
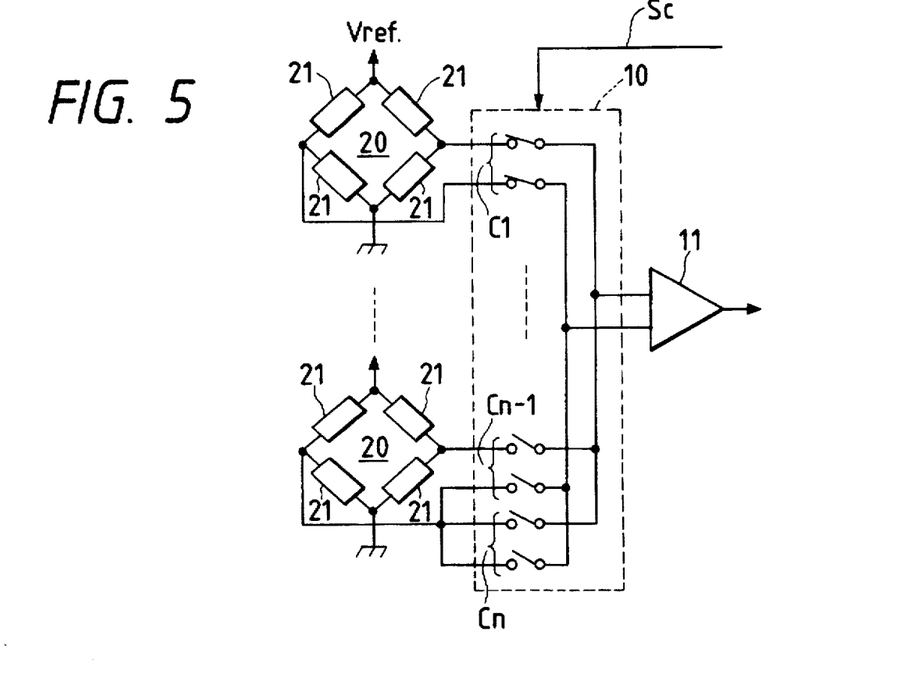
FIGS. 5 and 6 diagrams each showing a pre-stage circuit that may be applied to the signal processing circuit shown in FIG. 3.
Figure 6:
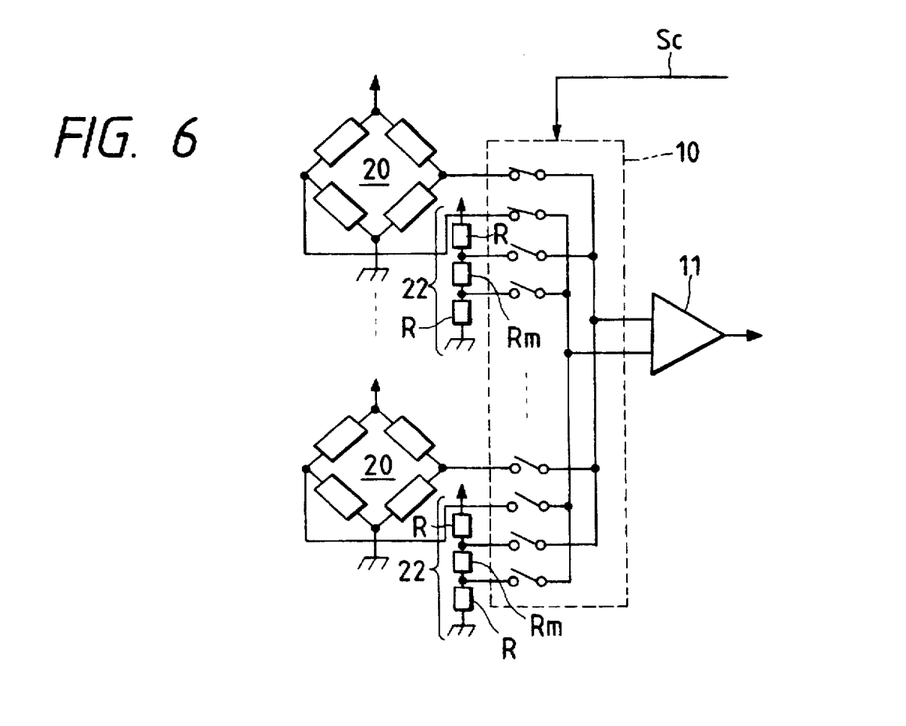

FIGS. 5 and 6 are diagrams each showing one example of a circuit disposed in a stage which is previous to the multiplexer 10 shown in FIG. 3. When drift compensation is to be made, the circuit is arranged as shown in FIG. 5, whereas, when load cell temperature compensation is to be made, the circuit is arranged as shown in FIG. 6. When drift compensation and load cell temperature compensation are to be made together, these circuit configurations are combined together.

In these figures, each bridge circuit 20 comprises four strain gages 21, which are provided for each of the load cells L, and output terminals of each bridge circuit 20 are connected to one of the input channels C1 . . . Cn−1 of the multiplexer 10. Since in FIG. 3 a drift occurs in a common analog signal processing circuit, one output terminal of one bridge circuit 20 is further branched to define reference voltage signal terminals, which are connected to one input channel Cn of the multiplexer 10, as shown in FIG. 5.

On the other hand, the load cell temperature compensation needs to be made for each load cell. Therefore, temperature detecting circuits 22 are attached to the bridge circuits 20, respectively, and output terminals of the detecting circuits 22 are connected to input channels of the multiplexer 10, as shown in FIG. 6.

Figure 7:
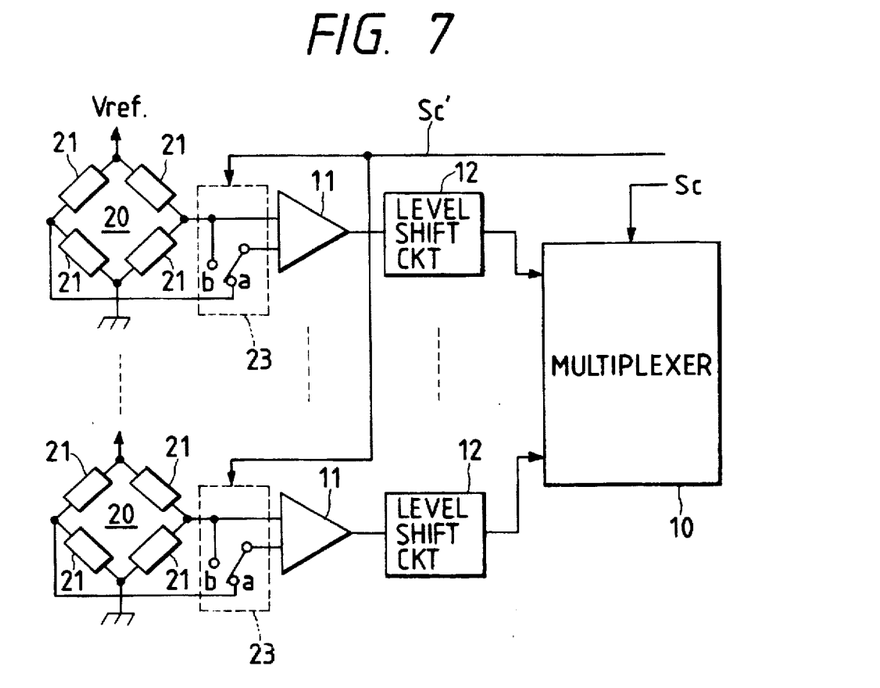
FIGS. 7 and 8 diagrams each showing a pre-stage circuit that may be applied to the signal processing circuit shown in FIG. 4.
Figure 8:
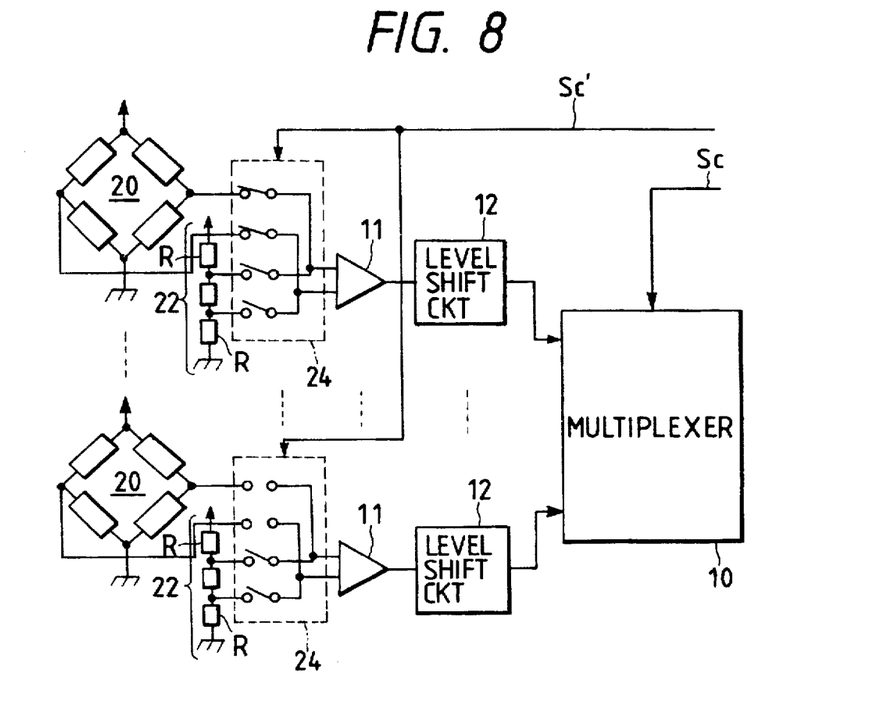

FIGS. 7 and 8 are diagrams each showing one example of a circuit disposed in a stage which is previous to the multiplexer 10 shown in FIG. 4. When drift compensation is to be made, the circuit is arranged as shown in FIG. 7, whereas, when load cell temperature compensation is to be made, the circuit is arranged as shown in FIG. 8. When drift compensation and load cell temperature compensation are to be made together, these circuit configurations are combined together.

Since in this example a drift occurs in the analog signal processing line of each load cell, a signal switching circuit 23 is provided in a stage which is previous to each operational amplifier 11 to selectively output a weight signal and a reference voltage signal by its signal switching operation. More specifically, each signal switching circuit 23 is normally connected to a contact a, and when the drift compensation mode is set, a switching signal Sc' is input thereto so that the circuit 23 is changed over to a contact b.

The load cell temperature compensation also needs to be made for each load cell; therefore, temperature detecting circuits 22 are attached to the bridge circuits 20, respectively, and output terminals of the detecting circuits 22 are connected to signal switching circuits 24, respectively, as shown in FIG. 8, to selectively output a weight signal and a reference voltage signal by a signal switching operation of each signal switching circuit 24. More specifically, each signal switching circuit 24 has input terminals for two channels and output terminals for one channel. One pair of input terminals of the signal switching circuit 24 are connected to output terminals of the bridge circuit 20, while the other pair of input terminals of the signal switching circuit 24 are connected to output terminals of the corresponding temperature detecting circuit 22, and the output terminals of the signal switching circuit 24 are connected to input terminals of the corresponding operational amplifier 11.

Each temperature detecting circuit 22 is a series circuit comprising a thermo-sensitive resistor Rm and precision resistors R. In particular, the thermo-sensitive resistor Rm, which functions as a temperature sensor, is provided in close contact with the load cell L.

The following is a description of the operations of these members, centered around the DSP.

[In a case where a plurality of load cell outputs are added together to determine a weight value]

First, the microcomputer 17 outputs a channel switching signal Sc to the multiplexer 10 and the DSP 16 to designate the first channel. In consequence, the analog signal S1 is input to the A/D converter means 14 through the multiplexer 10, the operational amplifier 11, the level shift circuit 12 and the anti-alias filter 13. The A/D converter means 14 converts the analog signal Sl to a digital quantity and outputs it to the DSP 16. The DSP 16 effects filtering according to a predetermined operational form on the basis of the numerical data obtained and the data row obtained in this channel in the past to obtain a digital quantity at this point of time and transfers it to the microcomputer 17. The microcomputer 17 stores the digital quantity transferred thereto and subsequently outputs a next channel switching signal Sc to designate the second channel, and after a similar processing is executed, the microcomputer 17 receives a digital quantity in the second channel. Such a processing is executed for each channel. The microcomputer 17 multiplies the digital quantity received from each channel by a coefficient for matching the output sensitivities of the load cell outputs, adds together the digital quantities, multiplies the resulting sum by a span coefficient to determine a weight value, and outputs it to the display means 19.

Alternatively, the following processing may also be executed. That is, filtering is effected in the DSP 16 to obtain a digital quantity filtered at that time, and this digital quantity is multiplied by the above-described coefficient for matching the output sensitivities and then stored in the DSP 16. When digital quantities from all the channels, each multiplied by the coefficient, have been obtained, the DSP 16 adds them together and outputs the resulting sum to the microcomputer 17. The microcomputer 17 multiplies the sum received from the DSP 16 by a span coefficient to obtain a weight value and outputs it to the display means 19.

It is also possible to execute the following processing. That is, the DSP 16 multiplies a digital quantity input from each channel by the above-described coefficient for matching the output sensitivities and sequentially stores the results. When digital quantities from all the channels, each multiplied by the coefficient, have been obtained, the DSP 16 adds them together, effects filtering according to a predetermined operational form on the basis of the sum data obtained and the sum data row obtained in the past, and outputs the resulting sum data to the microcomputer 17. The microcomputer 17 multiplies the sum by a span coefficient to obtain a weight value and outputs it to the display means 19.

[In a case where drift compensation is made]

A digital quantity from each channel is sequentially input to the DSP 16 in response to a channel switching signal Sc from the microcomputer 17. When a digital quantity of the reference voltage signal is input to the DSP 16 by a channel switching operation, it performs calculation according to a predetermined operational form on the basis of the input numerical data and the numerical data row concerning the reference voltage signal in the past to obtain a reference value at this point of time. Then, a reference value obtained in the preceding process is subtracted from the current reference value to determine a change $\Delta Di$ of the reference voltage, and the change $\Delta Di$ is added to the drift $IDi\text{-}1$ cumulated from the time of turning on the power supply until the preceding process to obtain a new drift $IDi$. In other words, the drift $IDi$ is given, as a cumulative value of the change $\Delta Di$, by $$IDi = \sum_{j=0}^{i} \Delta Dj$$

After a drift is obtained in this way, the DSP 16 subtracts the drift from a digital quantity of the weight signal after it has been multiplied by the above-described coefficient in the filtering for another channel. More specifically, filtering is effected as follows: A value that is obtained by multiplying the drift by the coefficient is subtracted from the digital quantity of the weight signal filtered. Alternatively, a value that is obtained by multiplying the drift by the coefficient is subtracted from the digital quantity of the weight signal before filtering. Thus, the drift that is contained in the weight signal in each channel is canceled by executing the process for all the channels once in turn.

In a case where weight signals from a plurality of channels are added together to determine a weight value, a drift in each channel is subtracted from the digital quantity of each weight signal before filtering, and the results of the subtraction are each multiplied by a coefficient and then added together, and the resulting sum is filtered. In the arrangement shown in FIG. 5, the sum of digital quantities corresponding to the weight signals is filtered, and a predetermined number-fold drift, compensated for by a coefficient, is subtracted from the result of the filtering. Thus, even when weight signals from a plurality of channels are added together, a drift that is contained in each weight signal is canceled.

[In a case where load cell temperature compensation is made]

Since the zero point change of the load cell output due to temperature is extremely slow considering the weighing processing time, the detection of a load cell temperature in this case need not be conducted so frequently as the drift compensation is made. Accordingly, the load cell temperature is detected at a predetermined period regardless of whether or not an object of weighing is placed on the apparatus.

Thus, when a load cell temperature is to be detected, the microcomputer 17 in the arrangement shown in FIG. 6 designates the channel of the target temperature detecting circuit 22 by a channel switching signal Sc to input a temperature detecting signal. In the arrangement shown in FIG. 8, the microcomputer 17 designates the input channel of the target load cell by a channel switching signal Sc and further outputs a switching signal Sc' to the signal switching circuit 24 to input a detection signal from the temperature detecting circuit 24. The DSP 16 performs computation on the digital quantity of the detected temperature input thereto and outputs the result of the computation to the microcomputer 17. The microcomputer 17 deduces a load cell temperature at that time from the output temperature characteristics of the temperature sensor already stored therein on the basis of the detected temperature and further calculates a zero point change of the load cell output at the temperature concerned from the deduced temperature and the output temperature characteristics of the load cell output. As for this processing, see Japanese Patent Unexamined Publication No. Sho. 63-204103.

The microcomputer 17 transfers the zero point change thus obtained to the DSP 16. The DSP 16 stores the transferred zero point change for each load cell and uses it when calculating a weight value for the corresponding load cell. More specifically, the DSP 16 filters the input digital quantity (weight signal) and then subtracts the zero point change from the filtered digital quantity to obtain a weight value at that time. Alternatively, the DSP 16 subtracts the zero point change from the digital quantity (weight signal) before filtering and filters the result of the subtraction to obtain a weight value at that time. Thus, the zero point change of the load cell that is contained in the weight signal is canceled.

When digital quantities from a plurality of channels are added together to determine a weight value, the zero point change in each channel is subtracted from the value before filtering and the result of the subtraction is multiplied by the coefficient and then filtered. Alternatively, the zero point change in each channel is subtracted from the value after filtering, and the result of the subtraction is multiplied by the coefficient. Then, the results are added together.

Thus, by jointly using the above-described drift compensation processing and load cell temperature compensation processing, it is possible to calculate an accurate weight value containing neither drift component nor zero point change.

Although the present invention has been described above by way of one example in which a plurality of load cell outputs are added together to determine a weight value, it should be noted that the present invention is not necessarily limited thereto and that various modifications may be adopted. For example, it will be apparent that the present invention may also be applied to an apparatue wherein analog signals from different lines are input through a plurality of channels, e.g., a combination weighing apparatus.

Industrial Applicability

As has been described above, the weight measuring apparatus according to the present invention is useful as a weight checker wherein a plurality of load cell outputs are added together to determine a weight value, or as a combination weighting apparatus wherein a plurality of weight values are combined to form a combination of weighing machines for a predetermined weight.

What is claimed is:

1. A weight measuring apparatus comprising:
a plurality of load channels;
a plurality of load sensors, each one of which is respectively coupled to one of said plurality of load channels, one or more of said load sensors outputting an analog signal corresponding to a load resting thereon;
input signal switching means coupled to said plurality of load channels for selectively outputting in response to a channel switching signal and analog signal from one of said plurality of load sensors in a time division manner;
analog-to-digital converter means, coupled to said input signal switching means and responsive to a synchronization signal, for converting an analog signal selectively outputted by said input signal switching means into a digital signal and for outputting said digital signal in response to the synchronization signal;
digital signal processing means, coupled to said analog-to-digital converter means for receiving a digital signal output from said analog-to-digital converter in response to the synchronization signal, said digital signal processing means comprising storing means for storing, for each of said load channels, a plurality of digital signals corresponding to a plurality of time sequential outputs of one of said load sensors, a pass filter sequentially filtering said plurality of digital signals stored in said storing means for each of said load channels to remove digital signals falling outside of a predetermined range, means for generating representative values for each of said load channels based on outputs of said pass filter, and means for generating the synchronization signal, wherein said analog-to-digital converter and digital signal processing means are synchronized with each other by the synchronization signal such that processing and filtering of said digital signals occurs in real-time; and
control means, coupled to said digital signal processing means, comprising means for receiving and storing said representative values for each of said plurality of load channels, means for further processing the stored values so as to generate a weight value corresponding to the load resting on one or more of said plurality of load sensors, and means for generating the channel switching signal.

2. A weight measuring apparatus as defined in claim 1, further comprising: an amplifier, coupled between said input signal switching means and said analog-to-digital converter means, operative to amplify the analog signal selectively outputted by said input signal switching means, said amplifier outputting an amplified signal to said analog-to-digital converter means.

3. A weight measuring apparatus as defined in claim 2, further comprising a level shift circuit, coupled between said amplifier and said analog-to-digital converter, being operative to bias the amplified signal so as to match a dynamic range of said analog-to-digital converter.

4. A weight measuring apparatus as defined in claim 3, further comprising an anti-aliasing filter, coupled between said level shift circuit and said analog-to-digital converter, for filtering an output of said level shift circuit.

5. A weight measuring apparatus as defined in claim 3, further comprising an anti-aliasing filter, coupled between said amplifier and said analog-to digital converter, for filtering an output of said amplifier.

6. A weight measuring apparatus as defined in claim 2, further comprising means for generating and applying a reference voltage signal to one of said plurality of channels, said digital signal processing means, receiving the reference voltage signal, and comprising means for calculating a drift compensation value corresponding to a change of said reference voltage signal, and means for subtracting, when digital quantities in a plurality of channels are combined together, the calculated drift compensation value from a digital quantity of another channel so as to compensate for drift occurring in a circuit including said amplifier.

7. A weight measuring apparatus as defined in claim 1, further comprising a plurality of temperature compensating circuits, respectively coupled to each of said plurality of load sensors, for detecting the temperature thereof and for outputting a temperature signal corresponding thereto, said digital signal processing means comprising means, responsive to the temperature signals, for compensating for any variation in temperature at each of the load sensors.

8. A weight measuring apparatus as defined in claim 1, wherein each of said plurality of channels comprises an amplifier and level shift circuit; said amplifier receiving and amplifying an output from a respective one of said plurality of load sensors; and said level shift circuit, coupled to an output of said amplifier, for biasing an output of said amplifier and outputting a signal to said multiplexer.

9. A weight measuring apparatus as defined in claim 1, wherein said digital signal processing means comprises means for filtering the digital signals output by said analog-to-digital converter means according to a numerical calculation, and a low-pass filter so as to remove measuring error factors present in the analog signals from each of the plurality of load channels.

10. A method for measuring weight of a load resting on one or more of a plurality of load sensors, said method comprising the steps of:
generating analog output signals corresponding to the load resting on one or more of said plurality of load sensors;
applying said analog output signals from each of said plurality of load sensors to a plurality of load channels;
generating a channel switching signal;
selectively enabling in response to the channel switching signal an output of said plurality of load channels one by one in order to output in a sequential manner one of said analog output signals;
generating a synchronization signal;
converting each analog output signals of said plurality of load channels from analog to digital form in response to the synchronization signal and outputting corresponding digital signals;
filtering the digital signals one by one in a sequential manner, wherein the steps of converting and filtering are synchronized with each other by the synchronization signal so as to occur in real-time; and
combining the filtered digital signals so as to generate a weight value corresponding to the load resting on one or more of said plurality of load sensors.

11. A method as defined in claim 10, further comprising the steps of:
multiplying the filtered digital signals from each of the load channels by a coefficient matching output sensitivities of the load sensors;
adding together the digital signals after each has been multiplied by the coefficient to produce a sum result; and
multiplying the sum result by a span coefficient to determine the weight value.

12. A weight measuring apparatus comprising:
  a plurality of load channels;
  a plurality of load sensors, each one of which is respectively coupled to one of said plurality of load channels, one or more of said load sensors outputting an analog signal corresponding to a load resting thereon;
  input signal switching means coupled to said plurality of load channels for selectively outputting in response to a channel switching signal an analog signal from one of said plurality of load sensors in a time division manner;
  analog-to-digital converter means, coupled to said input signal switching means and responsive to a synchronization signal, for converting an analog signal selectively outputted by said input signal switching means into a digital signal and for outputting said digital signal in response to the synchronization signal;
  digital signal processing means, coupled to said analog-to-digital converter means for receiving a digital signal output from said analog-to-digital converter in response to the synchronization signal, said digital signal processing means comprising storing means for storing, for each of said load channels, a plurality of digital signals corresponding to a plurality of time sequential outputs of one of said load sensors, means for processing said plurality of digital signals for each of the plurality of load channels in a time sequential manner to generate representative values for each of said load channels, means for storing said representative values, means for combining the stored values from one or more of the load channels to produce composite signals, a pass filter sequentially filtering said composite signals to remove any of said composite signals falling outside of a predetermined range, and means for generating the synchronization signal, wherein said analog-to-digital converter and digital signal processing means are synchronized with each other by the synchronization signal such that processing of said digital signals occurs in real-time; and
  control means, coupled to said digital signal processing means, comprising means for receiving the filtered composite signals from said digital signal processing means, means for processing the composite signals so as to generate a weight value corresponding to the load resting on one or more of said plurality of load sensors, and means for generating the channel switching signal.

13. A weight measuring apparatus as defined in claim 12, further comprising: an amplifier, coupled between said input signal switching means and said analog-to-digital converter means, operative to amplify the analog signal selectively outputted by said input signal switching means, said amplifier outputting an amplified signal to said analog-to-digital converter means.

14. A weight measuring apparatus as defined in claim 13, further comprising a level shift circuit, coupled between said amplifier and said analog-to-digital converter, being operative to bias the amplified signal so as to match a dynamic range of said analog-to-digital converter.

15. A weight measuring apparatus as defined in claim 14, further comprising an anti-aliasing filter, coupled between said level shift circuit and said analog-to-digital converter, for filtering an output of said level shift circuit.

16. A weight measuring apparatus as defined in claim 14, further comprising an anti-aliasing filter, coupled between said amplifier and said analog-to-digital converter, for filtering an output of said amplifier.

17. A weight measuring apparatus as defined in claim 13, further comprising means for generating and applying a reference voltage signal to one of said plurality of channels, said digital signal processing means, receiving the reference voltage signal, and comprising means for calculating a drift compensation value corresponding to a change of said reference voltage signal, and means for subtracting, when digital quantities in a plurality of channels are combined together, the calculated drift compensation value from a digital quantity of another channel so as to compensate for drift occurring in a circuit including said amplifier.

18. A weight measuring apparatus as defined in claim 12, further comprising a plurality of temperature compensating circuits, respectively coupled to each of said plurality of load sensors, for detecting the temperature thereof and for outputting a temperature signal corresponding thereto, said digital signal processing means comprising means, responsive to the temperature signals, for compensating for any variation in temperature at each of the load sensors.

19. A weight measuring apparatus as defined in claim 12, wherein each of said plurality of channels comprises an amplifier and level shift circuit; said amplifier receiving and amplifying an output from a respective one of said plurality of load sensors; and said level shift circuit, coupled to an output of said amplifier, for biasing an output of said amplifier and outputting a signal to said multiplexer.

20. A weight measuring apparatus as defined in claim 11, wherein said digital signal processing means comprises means for filtering the digital signals output by said analog-to-digital converter means according to a numerical calculation, and a low-pass filter so as to remove measuring error factors present in the analog signals from each of the plurality of load channels.

21. A method for measuring weight of a load resting on one or more of a plurality of load sensors, said method comprising the steps of:
  generating analog output signals corresponding to the load resting on one or more of said plurality of load sensors;
  applying said analog output signals from each of said plurality of load sensors to a plurality of load channels;
  generating a channel switching signal;
  selectively enabling in response to the channel switching signal an output of said plurality of load channels one by one in order to output in a sequential manner one of said analog output signals;
  generating a synchronization signal;
  converting each analog output signals of said plurality of load channels from analog to digital form in response to the synchronization signal and outputting corresponding digital signals;
  combining the digital signals from each of the plurality of channels so as to generate a composite value, wherein the steps of converting and combining are synchronized with each other by the synchronization signal so that said steps of converting and combining occur in real-time; and
  filtering the composite value to produce a weight value corresponding to the load resting on one or more of said plurality of load sensors.

22. A method as defined in claim 21, further comprising the steps of:
  multiplying the digital signals from each of the load channels by a coefficient matching output sensitivities of the load sensors prior to the step of combining;
  storing the digital signals after each has been multiplied by the coefficient; and adding together the stored digital signals from each of said load channels to produce the composite value.

23. A method as defined in claim 21, further comprising the step of: multiplying the composite value by a span coefficient to determine the weight value.

24. A weight conveyor comprising:

a plurality of load channels;

a plurality of load sensors, each one of which is respectively coupled to one of said plurality of load channels, one or more of said load sensors outputting an analog signal corresponding to a load resting thereon;

input signal switching means coupled to said plurality of load channels for selectively outputting in response to a channel switching signal an analog signal from one of said plurality of load sensors in a time division manner;

analog-to-digital converter means, coupled to said input signal switching means and responsive to a synchronization signal, for converting an analog signal selectively outputted by said input signal switching means into a digital signal and for outputting said digital signal in response to the synchronization signal;

digital signal processing means, coupled to said analog-to-digital converter means for receiving a digital signal output from said analog-to-digital converter in response to the synchronization signal, said digital signal processing means comprising storing means for storing, for each of said load channels, a plurality of digital signals corresponding to a plurality of time sequential outputs of one of said load sensors, a pass filter sequentially filtering said plurality of digital signals stored in said storing means for each of said load channels to remove said digital signals falling outside of a predetermined range, means for generating representative values for each of said load channels based on outputs of said pass filter, and means for generating the synchronization signal, wherein said analog-to-digital converter and digital signal processing means are synchronized with each other by the synchronization signal such that processing and filtering of said digital signals occurs in real-time; and control means, coupled to said digital signal processing means, comprising means for receiving and storing said representative values for each of said plurality of load channels, means for further processing the stored values so as to generate a weight value corresponding to the load resting on one or more of said plurality of load sensors, and means for generating the channel switching signal.

25. A combinational weighing machine comprising:

a plurality of load channels;

a plurality of load sensors, each one of which is respectively coupled to one of said plurality of load channels, one or more of said load sensors outputting an analog signal corresponding to a load resting thereon;

input signal switching means coupled to said plurality of load channels for selectively outputting in response to a channel switching signal an analog signal from one of said plurality of load sensors in a time division manner;

analog-to-digital converter means, coupled to said input signal switching means and responsive to a synchronization signal, for converting an analog signal selectively outputted by said input signal switching means into a digital signal and for outputting said digital signal in response to the synchronization signal;

digital signal processing means, coupled to said analog-to-digital converter means for receiving a digital signal output from said analog-to-digital converter in response to the synchronization signal, said digital signal processing means comprising storing means for storing, for each of said load channels, a plurality of digital signals corresponding to a plurality of time sequential outputs of one of said load sensors, a pass filter sequentially filtering said plurality of digital signals stored in said storing means for each of said load channels to remove said digital signals falling outside of a predetermined range, means for generating representative values for each of said load channels based on outputs of said pass filter, and means for generating the synchronization signal, wherein said analog-to-digital converter and digital signal processing means are synchronized with each other by the synchronization signal such that processing and filtering of said digital signals occurs in real-time; and control means, coupled to said digital signal processing means, comprising means for receiving and storing said representative values for each of said plurality of load channels, means for further processing the stored values so as to generate a weight value corresponding to the load resting on one or more of said plurality of load sensors, and means for generating the channel switching signal.

26. A weight measuring apparatus, comprising:

a plurality of load sensors;

a multiplexer coupled to said plurality of load sensors, for selectively outputting an output from each of said plurality of load sensors in response to a load sensor selection signal;

processing means programmed to generate the load sensor selection signal such that the multiplexer selects each load sensor in a repeating sequence;

amplifying means coupled to one output of the multiplexer and the outputs of the loads sensors, so as to provide an amplified analog signal for each of the load sensors;

an analog-to-digital converter, responsive to a synchronization signal, for converting the output of said amplifying means from an analog to a digital representation thereof; and digital signal processing means responsive to said load sensor selection signal, comprising a pass filter to filter a digital quantity output from the analog-to-digital converter corresponding to a currently selected load sensor in conjunction with a set of digital data obtained previously for the selected load sensor to generate a filtered value representative of the weight of a load supported by said load sensor, wherein said analog-to-digital converter and digital signal processing means are synchronized with each other by the synchronization signal such that processing and filtering of said digital signals occurs in real-time.

27. An apparatus according to claim 26, wherein the processing means is programmed to combine the filtered values from the digital signal processing means to generate a value representative of the weight of a load supported by the plurality of load sensors.

28. A weight measuring apparatus comprising:

a plurality of load sensors;

a multiplexer coupled to said plurality of load sensors, for selectively outputting an output from each of said plurality of load sensors in response to a load sensor selection signal;

processing means programmed to generate the load sensor selection signal such that the multiplexer selects each load sensor in a repeating sequence;

an amplifier coupled to one of the output of the multiplexer and the outputs of the load sensors, to provide an amplified analog signal for each of the load sensors;

an analog-to-digital converter for converting the output of said amplifier from an analog to a digital representation thereof; and digital signal processor responsive to said load sensor selection signal, said digital signal processor comprising means for multiplying in succession a load sensor sensitivity matching coefficient to a series of digital quantities output from the analog-to-digital converter corresponding to each of said plurality of load sensors selected in sequence by the load sensor selection signal until a multiplied digital quantity has been obtained for each of the load sensors, means for summing the multiplied digital quantities, and means for filtering the summed digital quantities in conjunction with a sum data row obtained previously to obtain a filtered value representative of the weight of a load supported by the plurality of load sensors.

29. An apparatus according to claim 28, wherein the digital signal processor comprises a low-pass filter programmed therein for effecting the filtering operation.

30. An apparatus according to claim 29, further comprising one or more level shift circuits for biasing the output of the amplifier means to match the dynamic range of the analog-to-digital converter.

31. An apparatus according to claim 30, further comprising an anti-aliasing filter for filtering an output of the level shift circuits.

32. A weight measuring apparatus according to any claim 31, further comprising a plurality of drift compensating circuits, respectively coupled to each of said plurality of load sensors, for outputting a reference voltage signal to compensate for drift occurring in a circuit including said amplifier means.

33. A weight measuring apparatus according to claim 32, wherein said digital signal processor calculates the drift from a change of said reference voltage signal and subtracts, when digital quantities in a plurality of channels are combined together, the calculated drift from a digital quantity in another channel.

34. A weight measuring apparatus according to claim 33, further comprising a plurality of temperature compensating circuits, respectively coupled to each of said plurality of load sensors, for detecting the temperature thereof and for outputting a signal corresponding thereto so that said digital signal processor can compensate for any variation in temperature, each of said plurality of temperature compensating circuits being selectively coupled to said amplifer.

35. A weight measuring apparatus according to claim 34, wherein said digital signal processor subtracts a zero point change of the load cell output calculated on the basis of the output signal from said temperature compensating circuits from a digital quantity corresponding to said load cell output.

36. A method of measuring the weight of a load using a plurality of load sensors, said method comprising the steps of:

generating a load sensor selection signal to cause an output from each of the load sensors to be selectively output in a repeating sequence;

amplifying the output of the load sensors before or after the selection step so as to provide an amplified analog signal for each of the load sensors;

converting the amplified outputs from an analog to a digital representation thereof;

supplying the digital output quantities in the said sequence to digital signal processing means; and causing the digital signal processing means, in response to the load sensor selection signal, to filter a digital output quantity corresponding to the currently selected load sensor in conjunction with a data row obtained previously for the selected load sensor to generate a filtered value representative of the weight of the load supported by said load sensor.

37. A method according to claim 36, further comprising the step of combining the filtered values from the digital signal processing means to generate a value representative of the weight of the load supported by the plurality of load sensors.

38. A method of measuring the weight of a load using a plurality of load sensors, said method comprising the step of:

generating a load sensor selection signal to cause an output from each of the load sensors to be selectively output in a repeating sequence;

amplifying the outputs of the load sensors before or after the selection step so as to provide an amplified analog signal for each of the load sensors;

converting the amplified outputs from an analog to a digital representation thereof;

supplying the digital output qualities in the said sequence to digital signal processing means; and causing the digital signal processing means, in response to the load sensor selection signal, to:
a) multiply a digital quantity corresponding to a currently selected load sensor by a load sensor sensitivity matching coefficient,
b) repeat step (a) for successive load sensors selected in sequence by the load sensor selection signal until a multiplied digital quantity has been obtained for each of the load sensors,
c) sum the multiplied digital quantities, and
d) filter the sum obtained in step (c) in conjunction with a sum data row obtained previously to obtain a filtered value representative of the weight of the load supported by the plurality of load sensors.

* * * * *